United States Patent [19]
Fay et al.

[11] Patent Number: 5,798,153
[45] Date of Patent: Aug. 25, 1998

[54] LINKING DEVICE FOR COMPOSITE RODS

[75] Inventors: Jean-Baptiste Fay, Paris; Michel Chardin, Colombes, both of France

[73] Assignee: Institut Francais du Petrole, Cedex, France

[21] Appl. No.: 276,323

[22] Filed: Jul. 18, 1994

[30] Foreign Application Priority Data

Jul. 19, 1993 [FR] France .................. 93 08934

[51] Int. Cl.⁶ .................. E21B 19/16; B29D 22/00
[52] U.S. Cl. .................. 428/34.5; 428/35.2; 428/161; 428/168; 428/182; 428/36.9; 138/173; 138/174; 174/35 R; 174/84 R; 403/204; 403/284; 385/53; 385/98; 385/99
[58] Field of Search ............... 428/34.9, 35.1, 428/35.2, 156, 161, 167, 168, 913, 36.4, 182, 34.5, 34.4, 36.9; 174/DIG. 8, 35 R, 84 R; 138/173, 174; 403/204, 284; 385/98, 99, 53

[56] References Cited

U.S. PATENT DOCUMENTS

| | | | |
|---|---|---|---|
| 4,016,356 | 4/1977 | McLoughlin | 428/34.9 |
| 4,148,557 | 4/1979 | Garvey | 350/96.2 |
| 4,232,712 | 11/1980 | Squires | 428/34.9 |
| 4,403,884 | 9/1983 | Barnes | 403/284 |
| 4,797,509 | 1/1989 | Cook | 174/DIG. 8 |
| 4,885,194 | 12/1989 | Tight, Jr. et al. | 174/DIG. 8 |
| 4,984,865 | 1/1991 | Lee et al. | 350/96.2 |
| 4,990,379 | 2/1991 | Jensen et al. | 428/34.9 |
| 5,085,494 | 2/1992 | Wesson et al. | 385/98 |
| 5,184,682 | 2/1993 | Delacour et al. | 166/85 |
| 5,451,278 | 9/1995 | Nolf | 428/34.9 |

FOREIGN PATENT DOCUMENTS 2 397 646 2/1979 France.

Primary Examiner—Rena L. Dye
Attorney, Agent, or Firm—Millen, White, Zelano & Branigan, P.C.

[57] ABSTRACT

A linking device intended notably for the connection of rods made of a composite material based on polymerizable resin and reinforcing fibers includes a tubular sleeve tightly connected to one end of a rod by plastic deformation of the sleeve placed around said end. The device is formed by a process for fastening linking means on elongated elements made of a composite material.

13 Claims, 2 Drawing Sheets

1

LINKING DEVICE FOR COMPOSITE RODS

FIELD OF THE INVENTION

The present invention relates to a linking device intended notably for the connection of rods made of a composite material based on polymerizable resin and reinforcing fibers. The invention further relates to a process for fastening linking means on elongated elements made of a composite material.

BACKGROUND OF THE INVENTION

U.S. Pat. No. 5,184,682 mentions an elastically flexible and compression resistant rod adapted for being pushed or pulled in a pipe. The pipe may notably be a wellbore or a tube which is itself placed in a well. This U.S. Pat. No. 5,184,682 describes a coupling suited to this type of rod and to the particular functions of this rod. However, this coupling, consisting of a set of mechanical parts co-operating with one another, has the disadvantage of a complex manufacturing and of a large diametral dimension. This latter characteristic limits the use of such a coupling to pipes whose inside diameter is large enough to allow passage of a composite rod including a coupling of this type.

SUMMARY OF THE INVENTION

The present invention thus relates to a linking device for an elongated element made of resin and reinforcing fibers. The device includes a tubular sleeve tightly connected to one end of said element by plastic deformation of said sleeve placed around said end.

The tubular sleeve may include, on the inner wall, at least a portion of corrugated surface.

The inner surface of the tubular sleeve may consist of at least one pair of truncated cones of revolution, identical and having parallel bases, placed contiguous, along the axis of the sleeve, so that their small bases coincide.

The inner surface of the sleeve may include at least three pairs of truncated cones connected to one another by the large bases, the small bases having substantially the diameter of the end of said element as the diameter and the half angle at the vertex of the cones ranges between 3 and 10 degrees.

The device may include a polymerizable substance between said end of the element and said sleeve.

Said substance may be a resin having substantially the same composition as said element.

Said substance may include solid particles, for example glass marbles.

The invention further relates to a process for mounting linking means on an elongated element made of fiber-reinforced resin. The process comprises the following stages:

placing around an end of said element a tubular sleeve whose inner surface includes at least a corrugated portion, said sleeve being connected to said linking means, tightly connecting said sleeve on said end by deforming plastically said sleeve through a centripetal compression.

In a variant of the process, a polymerizable substance may be placed between said end and the sleeve prior to the plastic deformation of said sleeve.

One end of an element may be connected to another end of another element through linking means including two sleeves adapted for co-operating with each of the ends.

Said element may include at least one electric, optical or fluid line, and said line may be connected after slipping said sleeves onto an element.

BRIEF DESCRIPTION OF THE DRAWINGS

Other features and advantages of the invention will be clear from reading the description hereafter given by way of non limitative examples, with reference to the accompanying drawings in which.

DESCRIPTION OF THE PREFERRED EMBODIMENTS

Figure 1:
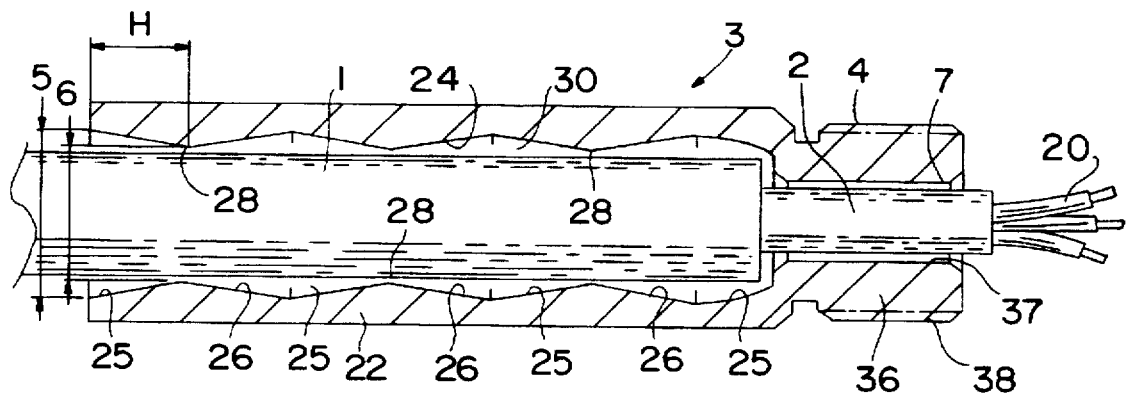
FIG. 1 is a section of an embodiment of a linking device according to the invention prior to crimping.

In FIG. 1, a tubular metal sleeve 3 having preferably a cylindrical external shape is placed around one end of a rod 1 made of a composite material.

The present invention is not limited to a single composition of the composite material, it is however particularly suited to the composite material consisting of cross-linkable, thermosetting or thermoplastic resin, reinforced with fibers, for example glass, carbon or polyaramid fibers.

The inner surface of the bore of sleeve 3 is so machined that, in cross section, the trace of the surface is a line displacing corrugations. The narrowest passage 6 of these corrugations must be such that the end of rod 1 may be slipped therein.

In the embodiment shown in FIG. 1, the inner surface of the bore of the sleeve is machined in a succession of identical truncated cones connected to one another by each of the corresponding bases, i.e. the trace of the inner surface is a broken line whose vertices 5 correspond to the large bases and the hollows 6 to the small bases of the truncated cones. The half angle at the vertex may range between about 3 and 10 degrees.

In FIG. 1, the sleeve is connected to a thread 4 allowing mechanical coupling with, for example, a measuring or a servicing tool, another coupling, a frame, a load bar or a tube. In case said composite rod includes an (electric, optical or fluid) line 2, a bore 7 is adapted for allowing passage of the line so as to connect it. Of course, the present invention may be implemented with any other connection means whose purpose is equivalent to that of thread 4.

Figure 2:
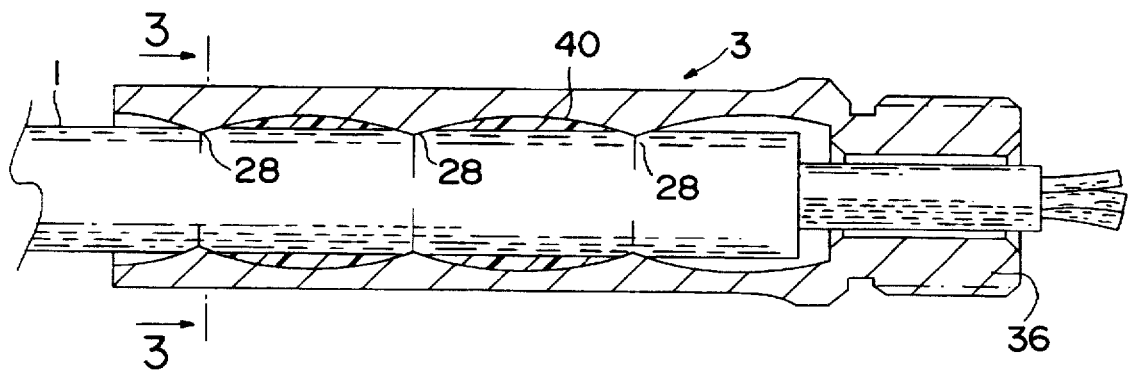
FIG. 2 is a sectional view of a linking device after crimping.

FIG. 2 shows sleeve 3 tightly connected to the end of rod 1 as a result of the plastic deformation or crimping of the sleeve on the rod. The reduction of the outside diameter of the sleeve provides a permanent tightening of the sleeve on the rod. The shape of the inner surface of the bore is adapted for providing, after plastic deformation, a sufficient surface of contact for withstanding longitudinal stresses, tensile as well as compressive stresses, or the torsional stresses which may be applied onto the rod through the sleeve and vice versa. Furthermore, the crushing stresses on the rod, due to the crimping, must not harm the cohesion of the composite material and in particular not break the reinforcing fibers. The broken line trace in FIGS. 1 or 2 is one of the preferred embodiments among other possible embodiments according to the present invention.

In order to improve the tight connection of the sleeve crimped on rod 1, the space contained between rod 1 and the inner surface of the sleeve may be filled, before crimping, with a cross-linkable substance or not, one purpose of which may be to increase the coefficient of friction between the rod and the sleeve or to provide sticking. A resin having substantially the same composition as that of the composite rod is preferably used for such a substance. A charge may also be mixed with this substance in the form of particles, for example glass marbles.

Figure 3:
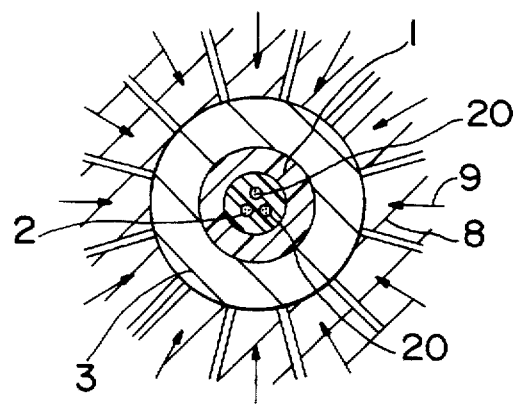
FIG. 3 is a sectional view of the working principle of the crimping means.

FIG. 3 is a sectional view of a crimping principle of sleeve 3 on rod 1. A series of jaws 8 is arranged around the circumference of the sleeve. A hydraulic jack system (not shown) provides on each jaw a centripetal force in the direction of the arrow bearing reference number 9. If the length of the jaws is less than the length of the sleeve, the crimping operation is repeated after the displacement in translation of the set of jaws over the length of the sleeve.

Figure 4:
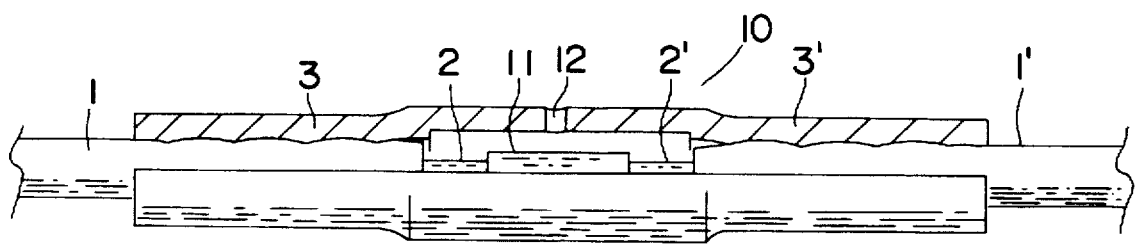
FIG. 4 describes a variant of the linking means applied to the connection of two ends of a composite rod.

FIG. 4 shows an application of the linking device according to the invention to the connection of two elongated elements 1 and 1' made of a composite material. The linking means 10 includes two sleeves 3 and 3' crimped on each of the ends of rods 1 and 1'. If the rods, include lines 2 and 2', a connection means 11 links the two lines 2 and 2' together. A port 12 may be used to have access to the inner space contained between the rods and the inside of the sleeves.

The mounting operation may be performed as follows:
element 10 is slipped onto one of rods 1 or 1',
lines 2 and 2' are connected through connection means 11,
element 10 is positioned, through translation, with respect to the two ends of rods 1 and 1' so that sleeves 3 and 3' are at the level of the ends of the rods,
a cross-linkable substance is injected through port 12 in order to improve the cohesion of sleeves 3 and 3' on rods 1 and 1',
the sleeves are crimped and said substance is polymerized thereafter.

It should be noted that adding a cross-linkable substance is an optional operation which is not indispensable for the present invention.

The connection achieved thereby notably displays the following qualities:
implementation quickness,
simplicity of the parts and of the tools,
the outside diameter of the coupling is reduced and rather close to the outside diameter of the rod,
the length of the coupling is reduced and optimized. In fact, the length of the crimped sleeve depends on the resistance desired for the coupling. If, for a given application, the anchoring resistance of the sleeve on the rod may be limited, the length of the sleeve may be reduced,
resistance of the linking means to bidirectional longitudinal stresses, traction and/or compression,
resistance to the twisting moment.

In a more specific aspect, the rod 1 is an elongated, elastically flexible, but compression resistant, cylindrical rod adapted to be pushed or pulled in a pipe (not shown). The rod 1 is made of resin and reinforcing fibers and has a selected outer diameter. Projecting from the "line" 2 are transmission elements 20 which may be, for example, electrical wires or cables, fluid transmission tubes optical fibers. The lines 2 may actually be a sheath for the transmission element or elements 20 but, in any event, is a portion of a diameter less than the diameter of the rod 1. The transmission element or elements are for connection to an instrumentality such as the instrumentation shown in U.S. Pat. No. 5,184,682 discussed in the Background of the Invention.

The sleeve 3 has a first potion 22 with an inwardly facing first wall 24 having a dimeter initially greater than that of the rod 1. The wall 24 is initially defined by a plurality of axially oriented frustoconical sections 25 and 26 which are arranged in opposed relation so as to define annular edges 28 at lines of intersection. The frustoconical sections 25 and 26 each diverge and converge to form spaces 30 between the annular edges 28. The sleeve 1 has a second portion 36 with an inner wall 37 having a diameter greater than the line or sheath 2. The second portion 36 has a helical thread 38 thereon for coupling with the threaded coupling of another device such as the instrumentality that the transmission elements 20 are connected.

The polymerizable material 40 is injected or inserted in the spaces 30 prior to squeezing first portion 22 of the sleeve. The second portion 36 is the sleeve is not squeezed to therefore avoid the risk of damaging the transmission elements 20.

TEST

A sleeve has been realized to be crimped on a 16 mm diameter composite rod whose intrinsic tensile strength is about 10 t.

The sleeve is manufactured from a tube made of soft steel XC 48 (yield limit about 350 MPa and breaking strength about 650 MPa, in standard state). XC48 is the AFNOR name for steel 1045 from the SAE-A151 classification. The outside diameter of the sleeve is 23 mm prior to crimping. The inside diameter bearing reference number 6 (FIG. 1) is 16.2 mm and the diameter bearing reference number 5 is 18.2 mm. The height of each truncated cone H is 10 mm. The corrugated inner surface of the sleeve consisting of six truncated cones, its length is thus 60 mm.

A cross-linkable substance of the epoxide type with hardener, for example Epikote 828 LM manufactured by the SHELL Company, mixed with a hardener TMHIDA (Tri Methyl Hexa Methyl Di Amine) manufactured by the H ULS Company (Germany), is set between the rod and the corrugated surface. Glass marbles whose average size is about 100 μm are added to the substance.

After crimping, the outside diameter of the sleeve is about 22.3 mm.

Traction tests performed on such a sleeve crimped on a composite rod have shown an anchoring resistance of the sleeve of at least 8 t.

We claim:

1. A linking device for joining single first and second elements having cylindrical at ends thereof, the first and second elements each having a first portion of a composite material and a second portion, coaxially disposed in the first portion and projecting therefrom, the device comprising:

a metal sleeve having a first tubular portion for receiving the end of the first element and a second tubular portion for receiving the end of the second element, the first and second tubular portions initially having inner walls defining a plurality of axially disposed opposed frustoconical surfaces which meet at annular edges defining annular teeth which grip the cylindrical surfaces of the first portions of the first and second elements when the tubular portions of the sleeve are subsequently inwardly deformed, the sleeve including an intermediate portion which is not deformed.

2. The linking device of claim 1, wherein the intermediate portion includes a vent hole.

3. The linking device of claim 1, wherein the elements include at least one electrical, optical or fluid line and a connection therefor, the connection being disposed within the intermediate tubular portion.

4. A device as claimed in claim 1, comprising a polymerizable composition between said end of the element and said sleeve.

5. A device as claimed in claim 4, wherein said polymerizable composition is a resin having substantially the same composition as that of said element.

6. A device as claimed in claim 4, wherein said polymerizable composition includes solid particles.

7. The device of claim 6, wherein the solid particles are glass spheres.

8. A linking device for joining an instrumentality to a transmission element deposed in an elongated elastically flexible but compression resistant cylindrical rod adapted to be pushed or pulled in a pipe, wherein the transmission element has a sheath, and wherein the rod is made of resin and reinforcing fibers and has a selected diameter, the linking device comprising:

a sheath having a diameter less than the diameter of the rod;

a metal sleeve having a first portion with an inwardly facing first circular wall of a first diameter initially greater than that of the rod, the first wall initially being defined by a plurality of opposed axially oriented frustoconical sections defining annular edges at lines of intersection with one another and diverging-converging spaces between the annular edges, the sleeve further having a second portion defining a second inwardly facing wall of a diameter greater than the sheath of the transmission element but less than the first diameter, the second portion of the sleeve having a coupling portion adapted to mechanically couple with the instrumentality; the first portion of the sleeve being inwardly deformed to press the annular edges into the rod and the second portion of the sleeve remaining undeformed.

9. The linking device of claim 8, wherein the coupling portion comprises a helical thread.

10. The linking device of claim 9, wherein the diverging-converging spaces are filled with a polymerizable composition prior to inwardly deforming the first portion of the sleeve.

11. The linking device of claim 10, wherein the composition is the same composition as that of which the rod is formed.

12. The linking device of claim 11, wherein the composition further includes glass spheres.

13. The linking device of claim 8, wherein the transmission elements are electrical lines, optical lines or fluid transmission lines.

* * * * *